Patented Jan. 26, 1943

2,309,118

UNITED STATES PATENT OFFICE 2,309,118

AZO COMPOUNDS

William S. Jones and William Braker, Brooklyn, N. Y., assignors to E. R. Squibb & Sons, New York, N. Y., a corporation of New York No Drawing. Application December 23, 1939, Serial No. 310,830

7 Claims. (Cl. 260—155)

This invention relates to, and has for its object the provision of: I, azo compounds of the general formula

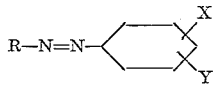

wherein R represents a nuclear radical of an acridine or 10-(lower alkyl)-acridinium halide, and X and Y represent each a member of the group consisting of hydrogen, alkyl, aryl, hydroxy, alkoxy, and amino; and II, acid-addition salts of the acridine azo bases.

These azo compounds are promising chemotherapeutic agents for the treatment of pyelitis, urethritis, prostatitis, cystitis, and other acute and chronic infections of the genito-urinary tract. The salts are water-soluble, and may be administered orally.

When either X or Y in the above general formula is hydroxy or amino, the azo base may be prepared by diazotizing an acridine or 10-(lower alkyl)-acridinium halide having a nuclear amino group—inter alia, 2,8-diamino-acridine and acriflavine—and coupling the diazonium salt obtained with a compound of the general formula

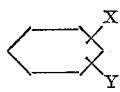

wherein X and Y have the meaning given hereinbefore but at least one is a hydroxy or amino group—inter alia, m-phenylene-diamine, m-phenetidine, aniline, phenol, resorcinol, m-cresol, m-phenylphenol, and m-toluidine; and when the acridine or 10-(lower alkyl)-acridinium halide radical in the above general formula embodies a nuclear hydroxy or amino group, the azo base may be prepared by diazotizing an amine of the general formula

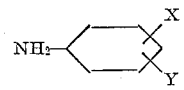

wherein X and Y have the meaning given hereinbefore—inter alia, aniline, o-, or p-toluidine, p-aminophenol, and p-phenetidine—and coupling the diazonium salt obtained with an acridine or 10-(lower alkyl)-acridinium halide embodying a nuclear hydroxy or amino group— inter alia, 2,8-diamino-acridine, acriflavine and 2,8-diamino-10-methyl-acridinium iodide.

The acridine azo bases obtained may be converted into acid-addition salts by reacting the base with the appropriate acid in a solvent, e. g., alcohol or acetone, and recovering the salt formed, e. g., by evaporating the solvent. The acids utilizable for preparation of such salts comprise, inter alia, hydrochloric, sulfuric, boric, tartaric, lactic, citric, and malic acids.

The following examples are illustrative of the invention:

EXAMPLE 1

3-(p-phenetylazo)-2,8-diamino-acridine 1.2 g. of p-phenetidine is dissolved in dilute hydrochloric acid, and diazotization is effected by the addition of 0.61 g. of sodium nitrite; 1.32 g. of 2,8-diamino-acridine dissolved in 20% hydrochloric acid is then added to the solution of the diazonium salt at 0° C. with constant stirring, and the coupling reaction is allowed to proceed with vigorous agitation at 0° C. for four hours. The solution is made ammoniacal, and the precipitate is collected, washed with water, and dried in a vacuum to yield the azo base as a red substance having the formula $C_{21}H_{19}N_5O$.

The hydrochloride $C_{21}H_{20}N_5OCl$ is obtained by adding 1.4 cc. (one equivalent) of normal hydrochloric acid to 0.5 g. of this base in alcoholic solution, and evaporating the solution to dryness.

EXAMPLE 2

3-(p-phenetylazo)-2,8-diamino-10-methyl-acridinium chloride 1.18 g. of p-phenetidine is dissolved in 20 cc. of normal hydrochloric acid, and diazotization is effected with a solution of 0.6 g. of sodium nitrite in 10 cc. of water; then 2.55 g. of acriflavine hydrochloride dissolved in 35 cc. of water is added to the solution of the diazonium salt at 0° C. with vigorous agitation, and the coupling reaction is allowed to proceed at 0° C. for two hours and at 20° C. for four hours. Precipitation is effected by neutralizing the solution, and the precipitate is collected, washed with water, and dried in a vacuum to yield a black flocculent salt having the formula $C_{22}H_{22}N_5OCl$.

The invention may be variously otherwise embodied within the scope of the appended claims.

We claim:

1. An azo compound of the general formula

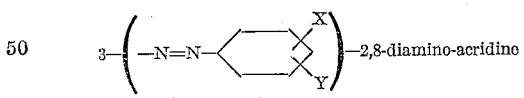

wherein X and Y each represent a member of the group consisting of hydrogen, alkyl, phenyl, hydroxy, alkoxy, and amino.

2. An azo compound of the general formula

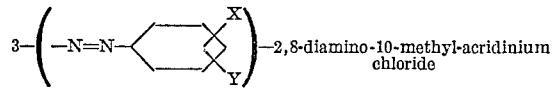

wherein X and Y each represent a member of the group consisting of hydrogen, alkyl, phenyl, hydroxy, alkoxy, and amino.

3. 3-(p-phenetylazo)-2,8-diamino-acridine.

4. 3-(p-phenetylazo)-2,8-diamino-10-methyl-acridinium chloride.

5. A compound of the group consisting of: azo bases formed by the coupling of a member of the group consisting of (nuclear amino)-acridines and (nuclear amino)-10-(lower alkyl)-acridinium halides with a diazotized amine of the general formula

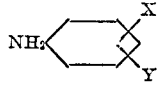

wherein X and Y represent each a member of the group consisting of hydrogen, alkyl, phenyl, hydroxy, alkoxy, and amino; and acid-addition salts of the acridine azo bases.

6. An azo compound of the general formula

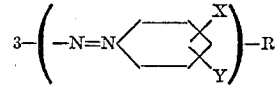

wherein X and Y each represent a member of the group consisting of hydrogen, alkyl, phenyl, hydroxy, alkoxy, and amino, and R represents a member of the group consisting of 2,8-diamino-acridine and 2,8-diamino-10-methyl-acridinium chloride.

7. 3-(p-phenetylazo)-2,8-diamino-acridine hydrochloride.

WILLIAM S. JONES.
WILLIAM BRAKER.